UNITED STATES PATENT OFFICE.

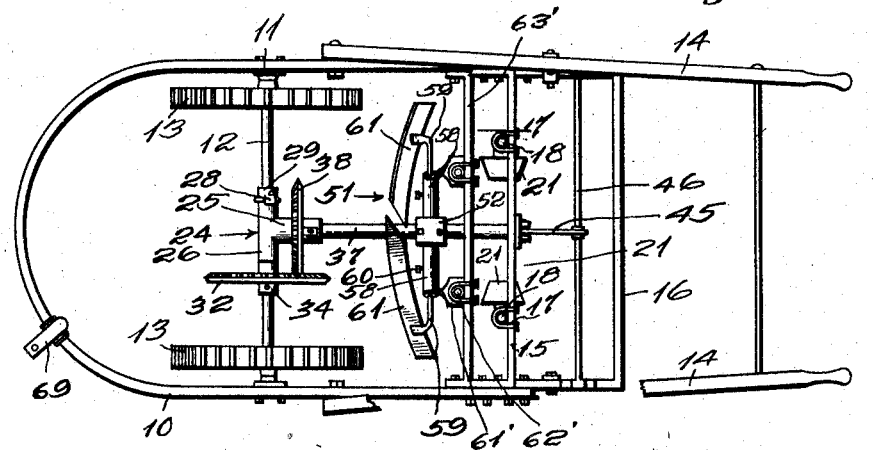
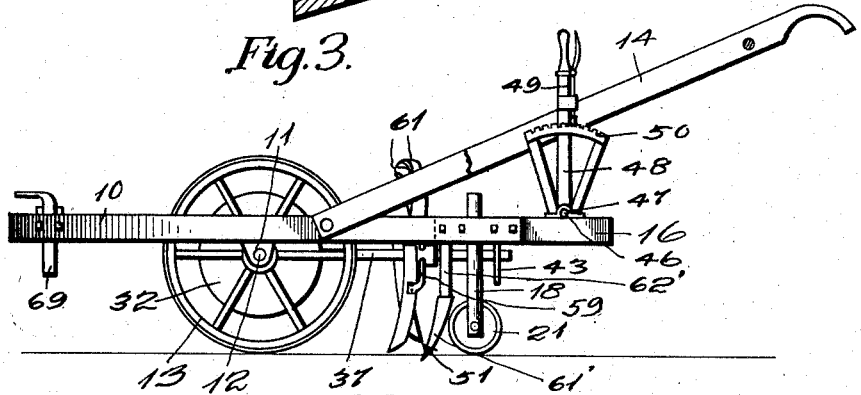

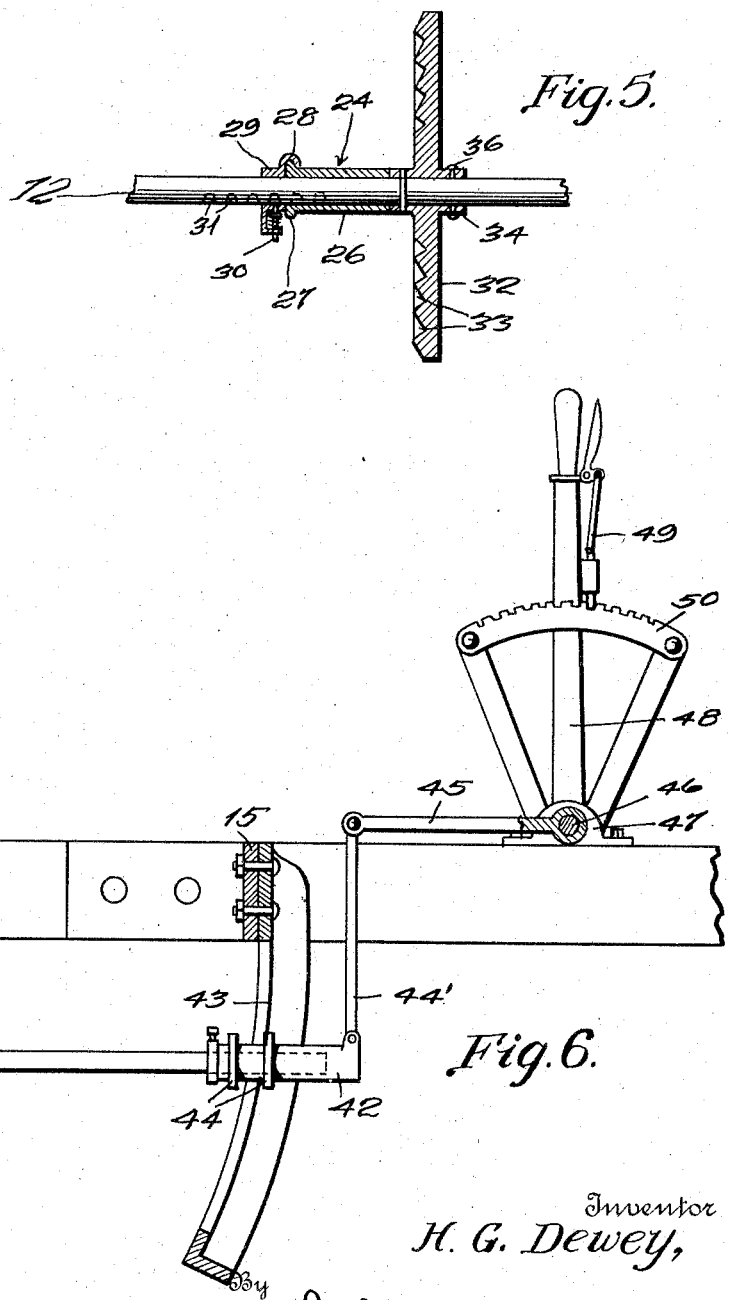

HAYWOOD G. DEWEY, OF WESTMINSTER, MARYLAND, ASSIGNOR TO JACKSON BRANDT, OF BALTIMORE, MARYLAND.

COTTON-CHOPPER.

1,300,133.  Specification of Letters Patent.  Patented Apr. 8, 1919.

Application filed February 5, 1917. Serial No. 146,755.

*To all whom it may concern:*

Be it known that I, HAYWOOD G. DEWEY, a citizen of the United States, residing at Westminster, in the county of Carroll and State of Maryland, have invented certain new and useful Improvements in Cotton-Choppers, of which the following is a specification.

My invention relates to improvements in agricultural machinery adapted to be used as a cotton chopper, and cultivator, while not necessarily restricted to this use.

An important object of the invention is to provide a cotton chopper having means for vertically adjusting the rotatable cutter and for supporting the same in such adjustment, during the cutting operation.

A further object of the invention is to provide means for chopping out the cotton, cultivating the same, and packing or firming the row.

A further object of the invention is to provide a machine of the above mentioned character, which is simple in construction, strong, durable and reliable in operation.

Other objects and advantages of the invention will be apparent during the course of the following description.

In the accompanying drawings forming a part of this specification and in which like numerals are employed to designate like parts throughout the same, Figure 1 is a plan view of a machine embodying the invention, showing the same in use as a cotton chopper, Fig. 2 is a side elevation of the same, Fig. 3 is a detail section through one of the hill engaging supporting wheels, Fig. 4 is a similar view through a driven bevel gear, Fig. 5 is a similar view through a driving bevel gear, and Fig. 6 is a side elevaton of mechansm for raising and lowering the rear end of the cutter carrying shaft.

In the drawings, wherein for the purpose of illustration is shown a preferred embodiment of my invention, the numeral 10 designates the main frame of the machine, which is preferably formed of an iron bar or beam bent into an approximately U-shape, with its closed end arranged forwardly, as shown.

Connected with the sides of the frame 10 are depending bearings 11, within which is journaled a transverse axle 12, having traction wheels 13 rigidly connected therewith. Connected with the sides of the frame 10 are rearwardly extending handles 14, as shown. The rear ends of the frame 10 are rigidly connected by a transverse bar 15 and an approximately U-shaped supplemental frame 16 is also rigidly connected with these rear ends, as shown.

The transverse bar 15 carries adjustable clamps 17, and as shown in Figs. 1, 2 and 3, and these adjustable clamps 17 receive and rigidly hold standards 18, spaced as shown. As shown in Fig. 3, the numeral 19 designates a tubular shaft, having a base 20, engaging the standard 18. A beveled hill engaging gage wheel 21 is rotatably mounted upon the tubular spindle 9 and held thereon by means of a cap 22 apertured for the reception of a bolt 23, also passing through the standard 18, as shown. The function of the wheels 21 is to retain the rear end of the frame and rotatable cutter carried thereby in the desired vertical position with respect to the hill of cotton, over which the machine is traveling.

As more clearly shown in Figs. 1, 4, and 5, the numeral 24 designates a T-shaped bearing as a whole, comprising tubular arms 25 and 26. The arm 26 is loosely mounted upon the axle 12, as more clearly shown in Fig. 5, and is provided at its outer end with an annular flange 27, received by an overhanging lip 28 formed upon a sleeve 29. The sleeve 29 is longitudinally adjustably mounted upon the axle 12 and carries a spring pressed dog 30 adapted for insertion within a selected opening or notch 31, whereby the sleeve 29 may be locked in adjustment at different longitudinal positions upon the axle 12. Arranged adjacent the opposite end of the sleeve 26 is a driven bevel gear 32, having a plurality of sets of annular bevel gear teeth 33, of different diameters, for providing different speeds. The bevel gear 32 has a hub 34, rigidly connected with the axle 12 by means of a transverse pin 36 or the like.

The numeral 37 designates a longitudinally extending cutter carrying shaft, the forward end of which is journaled in the arm 25 of the bearing 24, as shown in Fig. 4. A bevel gear 38 is loosely mounted upon the shaft 37 and has an apertured hub 39, receiving a spring pressed dog 40, adapted to be inserted within a selected opening or notch 41, whereby the bevel gear 38 may be locked in adjustment at different longitudinal positions upon the shaft 37. From the foregoing description it is obvious that by proper manipulation of the bearing 24 and the bevel gear 38, such bevel gear 38 may be brought into operative engagement with a selected annular set of bevel gear teeth 33.

As more clearly shown in Fig. 6, the rear end of the shaft 37 is journaled in a vertically movable bearing 42, operating within a slotted guide 43, as shown. The bearing 42 is provided with pairs of ears 44, arranged upon opposite sides of the wall of the slotted guide. The upper end of the guide 43 is bolted or otherwise detachably and rigidly connected with the transverse bar 15, as shown. The bearing 42 is raised and lowered by means of a link 44', pivotally connected with the free end of a crank 45, which is rigidly mounted upon a rock-shaft 46. This rock-shaft is journaled within bearings 47 secured upon the frame 10. The rock-shaft 46 is turned by the means of a lever 48, having a latch mechanism 49 engaging a stationary quadrant 50.

Rigidly mounted upon the shaft 37 (see Fig. 1), is a cutter mechanism designated as a whole by the numeral 51. This cutter mechanism comprises a hub 52 which is rigidly and detachably mounted upon the shaft 37 and carries tubular arms 58. These tubular arms receive radial rods 59, clamped therein by bolts 60. Cutter blades 61 are rigidly secured upon the rods 59 and are adapted to be suitably angularly adjusted.

Arranged between the hill engaging wheels 21 and the rotatable cutter are cultivator blades 61', carried by standards 62', detachably clamped to a bar 63', carried by the frame, as shown. The wheels 21 are in longitudinal alinement with the cultivator blades 61'.

Secured to the forward end of the frame 10 is a clevis or attaching device 69, for connection with draft mechanism.

In the operation of the machine as a cotton chopper, cultivator, and packer or former, as the same is drawn longitudinally of the hills of cotton, the supporting wheels 21 contact with the oppositely arranged inclined sides of the hill and maintain the rotating cutting mechanism 51 at the desired elevation. The vertical position of the cutting mechanism may be permanently adjusted by manipulation of the lever 48, as is obvious. The cutting mechanism receives its rotation from the wheels 13 through the medium of the intermediate gearing, and revolves in the well known manner for cutting out the cotton at spaced intervals. The cultivator blades 61' cultivate the chopped cotton, and the wheels 21 firm or pack the plowed rows.

It is to be understood that the forms of my invention herewith shown and described are to be taken as preferred examples of the same, and that various changes in the shape, size, and arrangement of parts may be resorted to without departing from the spirit of the invention or the scope of the subjoined claim.

Having thus described my invention, I claim:—

In a machine of the character described, a frame, traction wheels secured to the frame near its forward end for supporting such forward end of the machine, a longitudinal driving shaft receiving rotation from the traction wheels, a rotatable chopper carried by the rear end of the driving shaft, a transverse bar secured to the frame and arranged near and rearwardly of the rotatable chopper, cultivator blades secured to the bar and disposed rearwardly of the rotatable chopper to act upon the sides of the hill, bevel gage wheels secured to the frame and arranged rearwardly of and near the cultivator blades in longitudinal alinement therewith, and means to raise and lower the driving shaft.

In testimony whereof I affix my signature in presence of two witnesses.

HAYWOOD G. DEWEY.

Witnesses:
W. R. MYERS, Jr.,
WM. L. HAMPSHER.

Copies of this patent may be obtained for five cents each, by addressing the "Commissioner of Patents, Washington, D. C."